United States Patent
Takahashi et al.

(10) Patent No.: US 9,248,796 B2
(45) Date of Patent: Feb. 2, 2016

(54) VISUALLY-DISTRACTED-DRIVING DETECTION DEVICE

(75) Inventors: Akio Takahashi, Tochigi-ken (JP); Shinsuke Ueda, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 64 days.

(21) Appl. No.: 14/349,495

(22) PCT Filed: Jun. 6, 2012

(86) PCT No.: PCT/JP2012/064510
§ 371 (c)(1),
(2), (4) Date: Apr. 3, 2014

(87) PCT Pub. No.: WO2013/051306
PCT Pub. Date: Apr. 11, 2013

(65) Prior Publication Data
US 2014/0249717 A1    Sep. 4, 2014

(30) Foreign Application Priority Data
Oct. 6, 2011   (JP) .................. 2011-221522

(51) Int. Cl.
*G06F 7/00* (2006.01)
*B60R 21/00* (2006.01)
(Continued)

(52) U.S. Cl.
CPC .......... *B60R 21/00* (2013.01); *B60W 40/09* (2013.01); *B60W 50/14* (2013.01);
(Continued)

(58) Field of Classification Search
CPC .......... B60K 28/06; B60K 2350/2013; B60K 2350/962; B60K 2350/965; G06K 9/00845; G06K 9/00268; G06K 9/00281; G06K 9/00798; B60W 2040/0818; B60W 50/14; B60W 40/09; G01C 21/3626; G01C 21/3641; G01C 21/26; G08B 21/02; G08B 21/06; B60Q 2300/23; B60R 21/00; B60R 2300/302; G08G 1/16; G08G 1/166

USPC .............................................. 701/45, 36, 117
See application file for complete search history.

(56) References Cited

U.S. PATENT DOCUMENTS 6,253,150 B1 * 6/2001 Nakamura ................ 701/409
7,424,364 B2 * 9/2008 Gern .................... B62D 15/029
                                                           340/435

(Continued)

FOREIGN PATENT DOCUMENTS

JP    10-181380    7/1998
JP    2005-173703    6/2005

(Continued)

OTHER PUBLICATIONS

Japanese Notice of Allowance dated Nov. 18, 2014, Application No. 2013-537440, partial English translation included, 3 pages.

(Continued)

*Primary Examiner* — Thomas G Black
*Assistant Examiner* — Sze-Hon Kong
(74) *Attorney, Agent, or Firm* — Rankin, Hill & Clark LLP (57) ABSTRACT

A visually-distracted-driving detection device that can detect visually distracted driving with high accuracy. The visually-distracted-driving detection device includes a visually-distracted-driving determination unit that determines that a driver is visually distracted if the direction in which the driver is looking is greater than or equal to a predetermined angle with respect to the front of the driver; and a prohibition unit that, if it is specified that the present position of the vehicle as specified by a present-position specifying unit is within a first predetermined distance from an intersection, prohibits a process that is performed in cases where it is determined that the driver is visually distracted.

10 Claims, 8 Drawing Sheets

(51) Int. Cl.
- *G06K 9/00* (2006.01)
- *B60W 40/09* (2012.01)
- *G08G 1/16* (2006.01)
- *G01C 21/36* (2006.01)
- *B60W 50/14* (2012.01)
- *B60K 28/06* (2006.01)
- *B60W 40/08* (2012.01)

(52) U.S. Cl.
CPC ....... *G01C 21/3602* (2013.01); *G01C 21/3641* (2013.01); *G06K 9/00798* (2013.01); *G06K 9/00845* (2013.01); *G08G 1/16* (2013.01); *G08G 1/166* (2013.01); *B60K 28/066* (2013.01); *B60R 2300/302* (2013.01); *B60W 2040/0818* (2013.01); *B60W 2540/18* (2013.01); *B60W 2540/22* (2013.01); *G01C 21/3697* (2013.01)

(56) References Cited

U.S. PATENT DOCUMENTS

| | | | | |
|---|---|---|---|---|
| 8,144,002 | B2* | 3/2012 | Kiuchi | 340/435 |
| 2004/0150514 | A1* | 8/2004 | Newman | B60Q 9/008 340/435 |
| 2005/0156757 | A1* | 7/2005 | Garner | 340/907 |
| 2006/0071814 | A1* | 4/2006 | Cummings et al. | 340/903 |
| 2006/0195241 | A1* | 8/2006 | Nakagoshi | 701/45 |
| 2007/0089054 | A1* | 4/2007 | Morimoto | 715/700 |
| 2008/0024284 | A1* | 1/2008 | Baratoff et al. | 340/435 |
| 2008/0082259 | A1 | 4/2008 | Landschaft et al. | |
| 2008/0185207 | A1* | 8/2008 | Kondoh | 180/272 |
| 2008/0278301 | A1* | 11/2008 | Kaneiwa | 340/439 |
| 2009/0303078 | A1* | 12/2009 | Mochizuki et al. | 340/901 |
| 2009/0304232 | A1* | 12/2009 | Tsukizawa | A61B 3/113 382/103 |
| 2010/0004839 | A1* | 1/2010 | Yokoyama et al. | 701/70 |
| 2010/0033333 | A1* | 2/2010 | Victor et al. | 340/576 |

FOREIGN PATENT DOCUMENTS

| | | |
|---|---|---|
| JP | 2007-072629 | 3/2007 |
| JP | 2007-226666 | 9/2007 |
| JP | 2007-303858 | 11/2007 |
| JP | 2008-123443 | 5/2008 |
| JP | 2008-217693 | 9/2008 |
| JP | 2009-122002 | 6/2009 |
| JP | 2010-048636 | 3/2010 |
| JP | 2010-105417 | 5/2010 |

OTHER PUBLICATIONS

European Search Report dated Apr. 24, 2015, 8 pages.

* cited by examiner

VISUALLY-DISTRACTED-DRIVING DETECTION DEVICE

TECHNICAL FIELD

The present invention relates to a visual distraction detecting apparatus (visually-distracted-driving detection device) for detecting whether an occupant (driver, etc.) of a vehicle is visually distracted.

BACKGROUND ART

In relation to a visual distraction detecting apparatus, there has been proposed a technology that inhibits the visual distraction detecting apparatus from judging a visual distraction if a certain condition is satisfied. See, Japanese Laid-Open Patent Publication No. 2007-072629 (hereinafter referred to as "JP2007-072629A"). According to JP2007-072629A (see FIG. 6), if a steering angle δ is not equal to or less than a predetermined steering angle δ0 (step 100: NO), if a turn signal switch 34 is not off (step 102: NO), if a gear shift position is not a forward position (step 104: NO), or if the road is not straight (step 106: NO), then the output of a facial image camera 18 is invalidated and information concerning a facial angle θ is invalidated (step 110), thereby inhibiting the visual distraction detecting apparatus from judging the occurrence of a visual distraction. The proposed technology aims to perform various warning processes that are suitable in the case of a visual distraction (see paragraphs [0055] through [0066]).

The process of judging whether the road is straight or not (step 106) is performed by judging a road lane, in which the vehicle is traveling at present or in which the vehicle is expected to travel several seconds later, as a straight road if the curvature of the traveled road lane, which is detected based on information supplied from a white line recognizing ECU 38, is less than a predetermined curvature, or if the yaw angle of the vehicle is less than a predetermined angle (see paragraph [0058]).

SUMMARY OF INVENTION

According to JP2007-072629A, as described above, it is judged whether a visual distraction should be inhibited from being judged or not. The judgment conditions for the judging process include the steering angle δ, the on/off state of the turn signal switch 34, the gear shift position, and the straightness of the road (i.e., the curvature of the traveled road lane or the yaw angle). Therefore, the technology according to JP2007-072629A fails to deal with a crossroad intersection where straight roads run through one another continuously, for example.

According to JP2007-072629A, for example, the visual distraction detecting apparatus is inhibited from judging a visual distraction (step 110) if a turn signal switch 34 is on (step 102: NO). However, while the turn signal switch 34 is off, if the driver who intends to turn at an intersection is looking in a direction along which the vehicle will travel after turning at the intersection, the visual distraction detecting apparatus tends to judge that the driver is visually distracted.

Similarly, according to JP2007-072629A, if the curvature of the traveled road lane, which is detected based on information supplied from the white line recognizing ECU 38, is not less than a predetermined curvature (step 106: NO), then the visual distraction driving detecting apparatus is inhibited from judging a visual distraction (step 110). However, in a case where the vehicle approaches a crossroad intersection where straight roads run through one another continuously, if a judgment is made only based on the curvature of the traveled road lane, then the vehicle is judged erroneously as traveling straightly even if the driver intends to make a turn at the intersection.

The present invention has been made in view of the aforementioned problems. It is an object of the present invention to provide a visual distraction detecting apparatus, which is capable of detecting a visual distraction with high accuracy.

A visual distraction detecting apparatus according to the present invention comprises a present position identifying unit for identifying a present position of a vehicle, the present position identifying unit including map data, a gazing direction detecting unit for detecting a gazing direction of an occupant of the vehicle based on a viewing direction or a facial direction of the occupant, a visual distraction judging unit for judging that the occupant is visually distracted if the gazing direction of the occupant is angularly spaced from a front direction of the occupant by a predetermined angle or greater, and an inhibiting unit for inhibiting a process, which would be performed if the occupant were judged as being visually distracted, when the present position identified by the present position identifying unit is located within a first predetermined distance from an intersection.

According to the present invention, when the vehicle approaches an intersection, a process, such as a visual distraction warning process, for example, which would be performed if the occupant were judged as being visually distracted, is inhibited. Therefore, an action that the occupant takes to confirm the left or right of the vehicle is not judged erroneously as being a visual distraction. Consequently, the process, which should be performed only if the occupant is judged as being visually distracted, can be performed accurately.

The visual distraction detecting apparatus may further comprise a route guiding unit for guiding the vehicle along a route set by the occupant, wherein the intersection is an intersection at which the route guiding unit guides the occupant to make a turn. In situations where it is highly likely that the occupant confirms the left or right of the vehicle, the process, which would be performed if the occupant were judged as being visually distracted, can be inhibited. Consequently, the process, which should be performed only if the occupant is judged as being visually distracted, can be performed accurately.

The visual distraction detecting apparatus may further comprise an informing unit for informing the occupant of the intersection when the vehicle reaches a position within a second predetermined distance from the intersection at which the route guiding unit guides the occupant to make a turn, wherein the inhibiting unit inhibits the process, which would be performed if the occupant were judged as being visually distracted, after the informing unit has informed the occupant and until the present position identifying unit judges that the vehicle has completed a change in path. Therefore, the process which would be performed if the occupant were judged as being visually distracted, can be inhibited after informing of the intersection and only until the vehicle actually finishes turning through the intersection. Consequently, the process, which should be performed only if the occupant is judged as being visually distracted, can be performed accurately.

The visual distraction detecting apparatus may further comprise a steering angle detecting unit for detecting a steering angle of a steering wheel of the vehicle, wherein the inhibiting unit inhibits the process, which would be performed if the occupant were judged as being visually distracted, until the steering angle detecting unit detects that the steering angle has changed from a value that is greater than a predetermined steering angle threshold value to a value that is less than the predetermined steering angle threshold value. Therefore, a visual distraction warning can be inhibited from being issued only until the vehicle actually finishes turning. Consequently, the process, which should be performed only if the occupant is judged as being visually distracted, can be performed accurately.

The visual distraction detecting apparatus may further comprise a resetting unit for automatically resetting a route when the vehicle has traveled along a route that differs from the route along which the route guiding unit has guided the vehicle, wherein the inhibiting unit may inhibit the process, which would be performed if the occupant were judged as being visually distracted, until the resetting unit automatically resets a route. Even if the vehicle deviates from the route along which the route guiding unit has guided the vehicle, the process, which would be performed if the occupant were judged as being visually distracted, can be prevented from being performed while the route is being reset.

The first predetermined distance may be shorter than, longer than, or equal to the second predetermined distance. If the first predetermined distance is shorter than the second predetermined distance, then even if the occupant confirms the left or right of the vehicle in response to being prompted by information from the informing unit, the action to confirm the left or right of the vehicle can be prevented from being judged erroneously as a visual distraction. Therefore, the process, which should be performed only if the occupant is judged as being visually distracted, can be performed accurately.

According to the present invention, there also is provided a visual distraction detecting apparatus comprising a gazing direction detector for detecting a gazing direction of a driver of a vehicle based on at least one of a viewing direction and a facial direction of the driver, a visual distraction judging section for judging whether the driver is visually distracted, using an angle formed between the gazing direction and a front direction of the driver, or a direction along which the vehicle is traveling, and an intersection approach judging section for detecting whether the vehicle is approaching an intersection. If the vehicle is approaching the intersection, the visual distraction judging section does not judge that the driver is visually distracted, or alternatively, a process, which would be performed if the driver were judged as being visually distracted, is not performed even if the visual distraction judging section judges that the driver is visually distracted.

According to the present invention, if the vehicle is approaching an intersection, the process, which would be performed if the occupant were judged as being visually distracted, is not performed. If the visual distraction detecting apparatus according to the present invention is incorporated in a configuration in which a warning is issued upon detection of a visual distraction, an action that the occupant of the vehicle takes to confirm the left or right side of the vehicle at an intersection, or to gaze at a pedestrian or the like, is not judged erroneously as being a visual distraction. Hence, an inappropriate warning is avoided. Further, if a certain numerical value, e.g., a TTC (Time To Contact) threshold value for judging whether a warning should be issued or not, is changed upon detection of a visual distraction, then such a numerical value can be set appropriately.

DESCRIPTION OF EMBODIMENTS

1. Description of Overall Arrangement
[1-1. Overall Arrangement]

Figure 1:
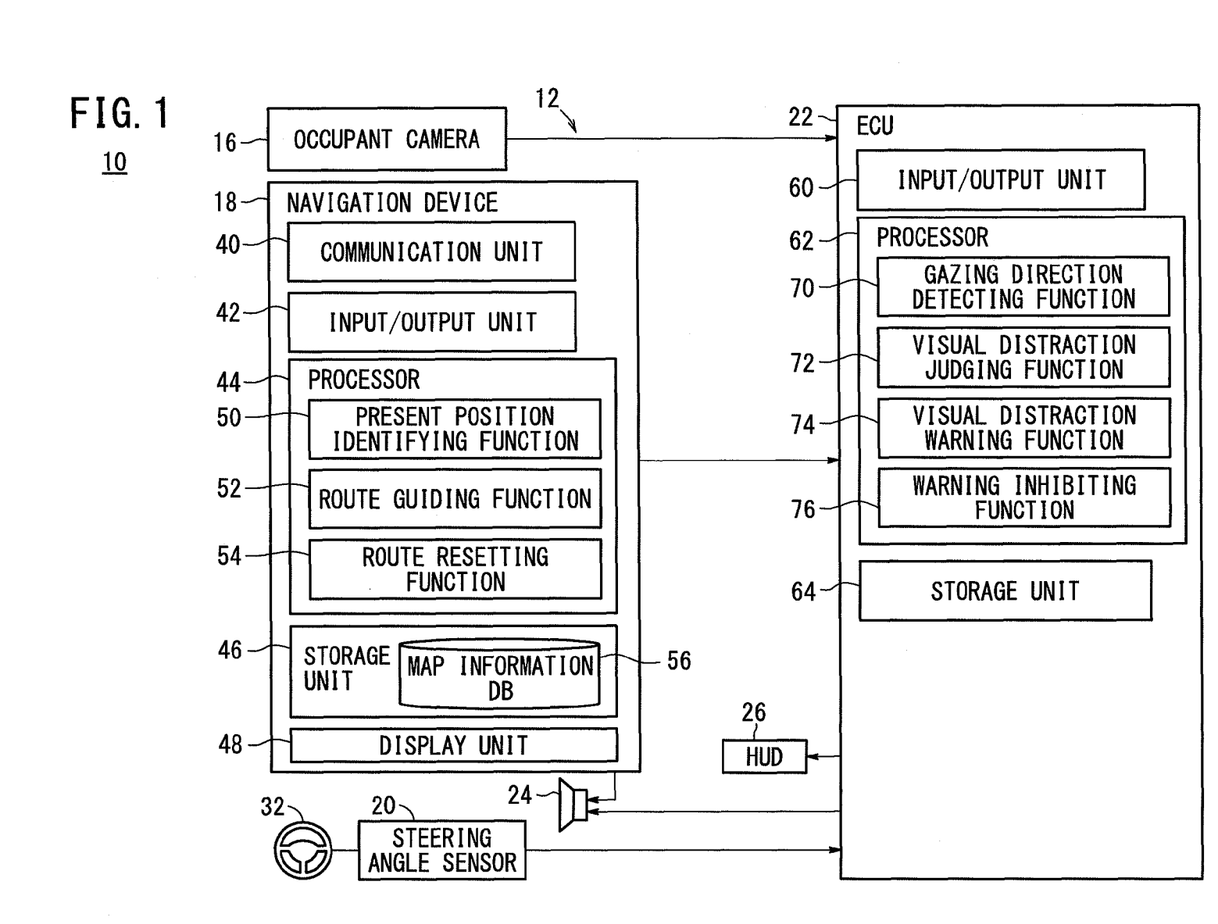
FIG. 1 is an overall block diagram of a vehicle, which incorporates therein a visual distraction warning apparatus as a visual distraction detecting apparatus according to an embodiment of the present invention.
Figure 2:
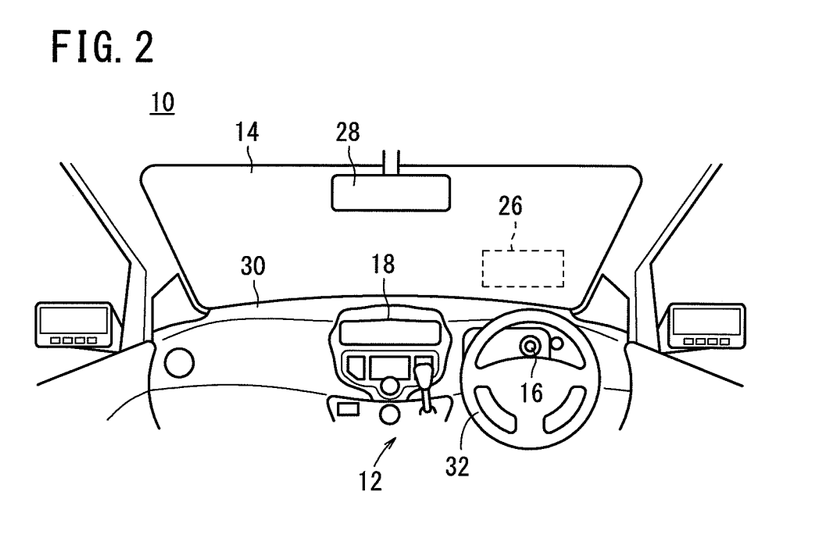
FIG. 2 is a view showing a peripheral area around a front windshield of the vehicle.

FIG. 1 is an overall block diagram of a vehicle 10 that incorporates therein a visual distraction warning apparatus 12 (hereinafter also referred to as a "warning apparatus 12") as a visual distraction detecting apparatus according to an embodiment of the present invention. FIG. 2 is a view showing a peripheral area around a front windshield 14 of the vehicle 10. As shown in FIGS. 1 and 2, the warning apparatus 12 includes an occupant camera 16, a navigation device 18, a steering angle sensor 20, an electronic control unit 22 (hereinafter referred to as an "ECU 22"), a speaker 24, and a headup display 26 (hereinafter referred to as a "HUD 26"). As shown in FIG. 2, the vehicle 10 according to the present embodiment is a so-called right-hand drive vehicle. Alternatively, the vehicle 10 may be a left-hand drive vehicle having the same arrangement as described above.

[1-2. Occupant Camera 16]

As shown in FIG. 2, the occupant camera 16 (image capturing unit) is mounted on a steering column, not shown, directly in front of the driver seat of the vehicle 10. The occupant camera 16 captures an image of the face (head) of the driver (hereinafter referred to as a "facial image"). The occupant camera 16 is not limited in position to the illustrated position, but may be positioned near a rearview mirror 28 (FIG. 2) or on a dashboard 30. The occupant camera 16 is not limited to a camera for capturing an image in one direction, but may be a camera for capturing images in multiple directions (a so-called stereo camera). The occupant camera 16 may be a color camera, a monochromatic camera, or a near-infrared camera.

[1-3. Navigation Device 18]

The navigation device 18 uses a GPS (Global Positioning System) to detect the present position of the vehicle 10, and guides the user (occupant) through a route to the destination. As shown in FIG. 1, the navigation device 18 includes a communication unit 40, an input/output unit 42, a processor 44, a storage unit 46, and a display unit 48.

The communication unit 40 acquires positional information from a GPS satellite, and performs wireless communications with an external server, not shown. The input/output unit 42 is used to communicate with the ECU 22 and the speaker 24.

The processor 44 performs various processing routines for controlling operations of various parts of the navigation device 18 as well as performing route guidance. As shown in FIG. 1, the processor 44 includes a present position identifying function 50, a route guiding function 52, and a route resetting function 54. The present position identifying function 50 (present position identifying unit) identifies the present position of the vehicle 10 based on positional information from the GPS satellite and map information that is stored in the storage unit 46.

The route guiding function 52 (route guiding unit, informing unit) sets a route for guiding the user (hereinafter referred to as a "guidance route") based on the destination given by the occupant and the present position of the vehicle 10, and guides the user through the guidance route. Alternatively, a guidance route may be set by an external server. More specifically, the route guiding function 52 may send the destination and the present position to an external server through the communication unit 40, and the navigation device 18 (route guiding function 52) may receive and use a guidance route, which is set by the external server based on the destination and the present position. The route resetting function 54 (resetting unit) resets the guidance route if the path followed by the vehicle 10 deviates from the route that the navigation device 18 uses for guiding the vehicle 10.

The storage unit 46 serves to store various programs and data, and has a map database 56 (hereinafter referred to as "map information DB 56"). The map information DB 56, which stores map information, is used by the processor 44 when the processor 44 performs route guidance. The data stored in the map information DB 56 includes information I1 concerning the path followed by the vehicle 10. The information I1 is made up of information concerning intersections and curves (positions of intersections, positions of entrances and exits of curves, curvatures of curves, etc.).

The display unit 48, which includes a touch panel or the like, serves to input information to and output information from the navigation device 18. For example, a destination is entered into the navigation device 18, and a route to the destination is extracted from the navigation device 18.

In FIG. 2, the navigation device 18 is installed in the vehicle 10. However, a portable information terminal such as a smartphone or the like may be used as the navigation device 18. If a portable information terminal is used as the navigation device 18, then the map information DB 56 may be installed in the external server, and the portable information terminal may request the external server to calculate a guidance route. The portable information terminal may receive the guidance route, which was calculated in response to the request, from the external server, and may supply the information I1, etc., to the ECU 22 through a wired or wireless link.

[1-4. Steering Angle Sensor 20]

The steering angle sensor 20 (steering angle detecting unit) detects a steering angle θs of a steering wheel 32 of the vehicle 10, and supplies the detected steering angle θs to the ECU 22.

[1-5. ECU 22]

As shown in FIG. 1, the ECU 22, which serves to control the visual distraction warning apparatus 12, includes an input/output unit 60, a processor 62, and a storage unit 64. The input/output unit 60 is used to communicate with the occupant camera 16, the navigation device 18, the steering angle sensor 20, the speaker 24, and the HUD 26.

As shown in FIG. 1, the processor 62 includes a gazing direction detecting function 70, a visual distraction judging function 72, a visual distraction warning function 74, and a warning inhibiting function 76. The gazing direction detecting function 70 (gazing direction detecting unit, gazing direction detector) detects a gazing direction of the driver based on at least one of the viewing direction (eyeball direction) and the facial direction of the driver (occupant).

The visual distraction judging function 72 (visual distraction judging unit, visual distraction judging section) judges whether or not the driver is visually distracted based on the gazing direction of the driver. If the visual distraction judging function 72 judges that the driver is visually distracted, then the visual distraction warning function 74 issues a warning against the visual distraction (hereinafter referred to as a "visual distraction warning"). According to the present embodiment, the visual distraction warning is issued both as a warning sound from the speaker 24 and displayed as a warning indication on the HUD 26. However, the visual distraction warning may be either one of a warning sound and a warning indication, or may be another type of warning, e.g., a warning given by turning on or blinking a predetermined indicator. Even if the visual distraction judging function 72 judges that the driver is visually distracted, the warning inhibiting function 76 (inhibiting unit, intersection approach judging section) inhibits the visual distraction warning function 74 from issuing a visual distraction warning if a predetermined condition is satisfied, as will be described in detail later.

[1-6. Speaker 24]

The speaker 24 is used to produce a speech output for delivering audible route guidance performed by the navigation device 18, and also to produce a warning sound, which is output as a visual distraction warning issued by the ECU 22 (visual distraction warning function 74). The speaker 24 may also be used for other purposes, such as producing sound outputs from radio broadcasts, television broadcasts, and audio devices.

[1-7. HUD 26]

The HUD 26 includes a display device mounted on the front windshield 14 of the vehicle 10, which displays the vehicle speed, mileage, guidance information for route guidance performed by the navigation device 18 (arrows for route guidance), and a warning image that provides a visual distraction warning issued by the ECU 22 (visual distraction warning function 74). The HUD 26 may also display other information, such as information that indicates the presence of pedestrians at night.

2. Overview of Control Process According to the Present Embodiment

Figure 3:
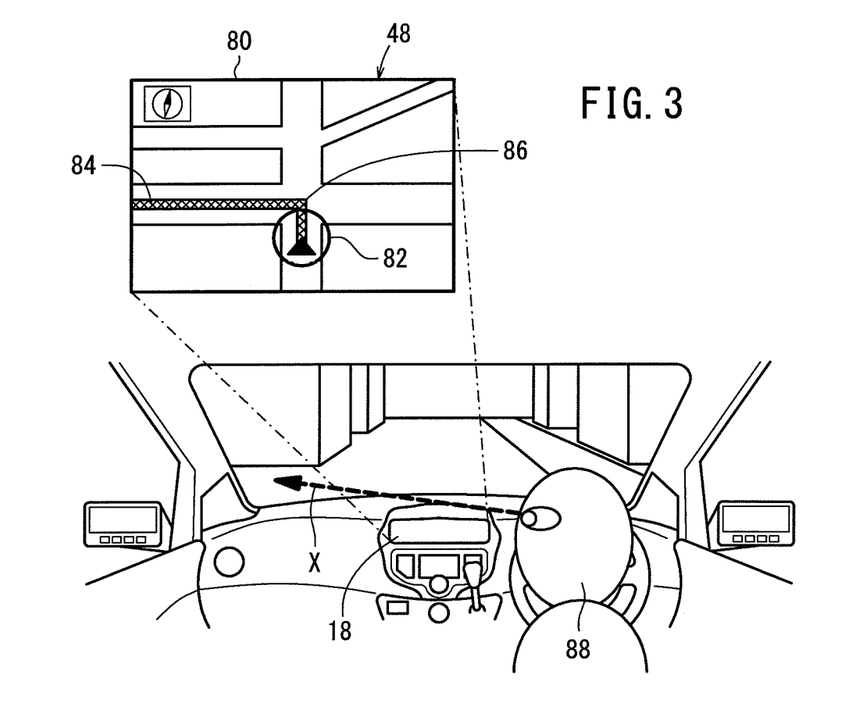
FIG. 3 is a view showing a situation in which the visual distraction warning apparatus is applied.

FIG. 3 is a view showing a situation in which the visual distraction warning apparatus 12 is applied. FIG. 3 shows by way of example a view, as seen from within the vehicle 10, of an area in front of the vehicle 10, along with a display screen 80 that is displayed on the display unit 48 of the navigation device 18. The display screen 80 includes an icon 82 representing the vehicle 10, and a straight line (guidance route line 84) on a road, which is representative of a guidance route set by the navigation device 18.

If there is an intersection 86 at which the vehicle 10 is expected to turn to the left or the right on the guidance route (guidance route line 84) set by the navigation device 18, then it is assumed that the driver 88 will gaze at a direction in which the vehicle 10 will travel in the future (i.e., a left forward direction in FIG. 3). Stated otherwise, although the gazing direction X of the driver 88 is different from the front direction of the driver 88 or the vehicle 10, i.e., the direction in which the vehicle 10 is traveling at present, the driver 88 is behaving normally, i.e., as required in order to drive the vehicle 10, and is not visually distracted. In this case, according to the present embodiment, a visual distraction warning is inhibited from being issued, and hence an inappropriate visual distraction warning can be avoided.

3. Details of Control Process According to the Present Embodiment

[3-1. Overall Sequence]

Figure 4:
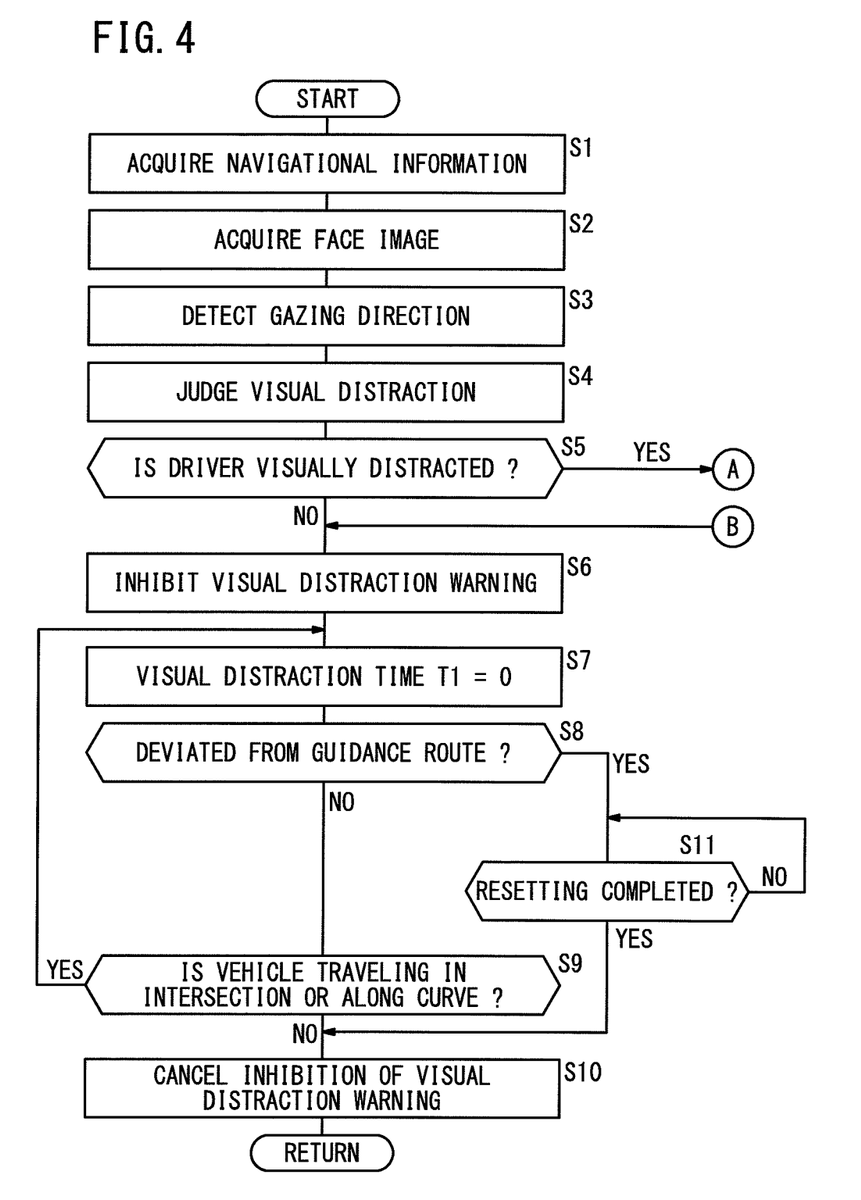
FIG. 4 is a first flowchart of a visual distraction detecting process carried out by the visual distraction warning apparatus.
Figure 5:
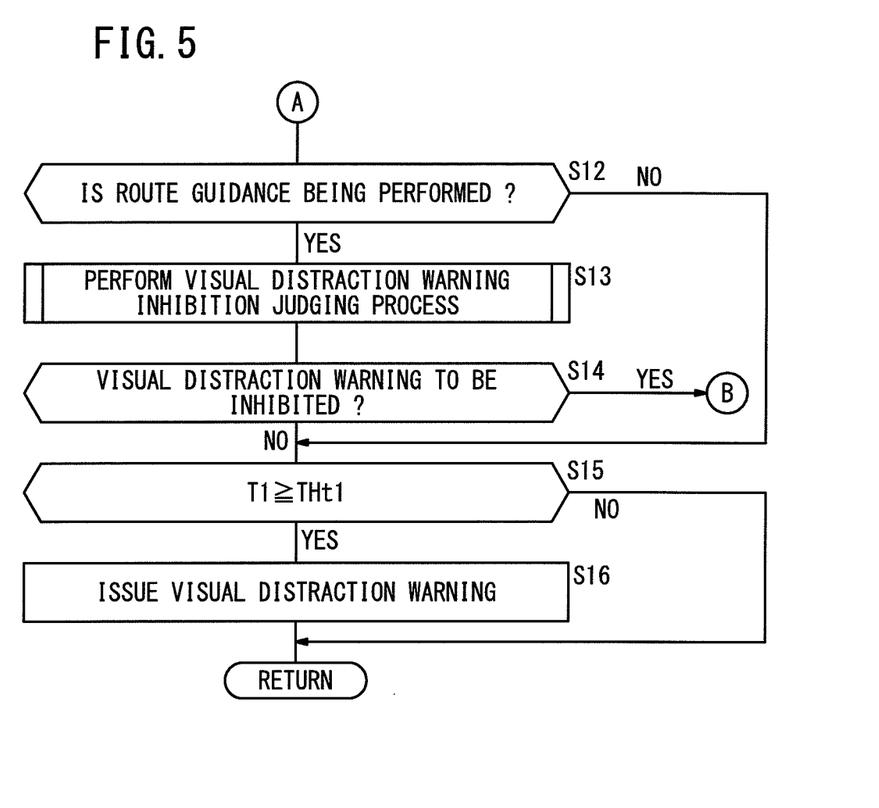
FIG. 5 is a second flowchart of a visual distraction detecting process carried out by the visual distraction warning apparatus.

FIGS. 4 and 5 are first and second flowcharts of a visual distraction detecting process, which is carried out by the visual distraction warning apparatus 12. In step S1, the ECU 22 acquires various items of information from the navigation device 18 (hereinafter referred to as "navigational information"). The navigational information includes the present position of the vehicle 10, in addition to the information I1 referred to above (information concerning intersections and curves).

In step S2, the occupant camera 16 acquires a facial image of the driver 88. In step S3, based on the facial image of the driver 88 that was acquired by the occupant camera 16, the ECU 22 detects a gazing direction X of the driver 88.

A viewing direction of the driver 88 can be detected by the method described in Japanese Laid-Open Patent Publication No. 2010-105417 (see paragraphs [0014] through [0016], for example).

The facial direction of the driver 88 can be detected in the following manner, for example. Based on the facial image captured by the occupant camera 16, the ECU 22 (gazing direction detecting function 70) detects the central position of the face along with left and right end positions of the face. Based on the detected positions, the ECU 22 approximates the face of the driver 88 to be a cylindrical shape, for example, and calculates the facial direction (cylinder process).

In step S4, using the gazing direction X (to be described in detail later), the ECU 22 (visual distraction judging function 72) judges whether or not the driver 88 is visually distracted. If the driver 88 is judged not to be visually distracted (step S5: NO) as a result of the visual distraction judging process performed in step S4, the ECU 22 (warning inhibiting function 76) inhibits a visual distraction warning from being issued, i.e., the ECU 22 does not perform the visual distraction warning function 74 in step S6.

In step S7, the ECU 22 resets a visual distraction time T1 to zero. The visual distraction time T1 represents an accumulated value of times during which the driver 88 has been judged as being visually distracted.

In step S8, the ECU 22 judges whether or not the vehicle 10 has deviated from the guidance route. If the vehicle 10 has not deviated from the guidance route (step S8: NO), then in step S9, using the navigational information referred to above, the ECU 22 judges whether or not the vehicle 10 is traveling in the intersection 86 or along a curve. If the vehicle 10 is traveling in the intersection 86 or along a curve (step S9: YES), then control returns to step S7. If the vehicle 10 is not traveling in the intersection 86 or along a curve (step S9: NO), then in step S10, the ECU 22 cancels inhibition of the visual distraction warning.

Inhibition of the visual distraction warning in step S6 may not be carried out as a specific process, and may be continued by repeating steps S7 through S9. If inhibition of the visual distraction warning is not carried out as a specific process, then cancelation of the inhibition of the visual distraction warning, which typically is performed in step S10, may not be carried out as a specific process.

Returning to step S8, if the vehicle 10 has deviated from the guidance route (step S8: YES), then in step S11, the ECU 22 judges whether or not resetting of a guidance route by the navigation device 18 has been completed. The guidance route is automatically reset by the route resetting function 54 of the navigation device 18. If resetting of the guidance route by the navigation device 18 has not been completed (step S11: NO), then the ECU 22 repeats step S11 until the resetting operation is completed. If resetting of a guidance route by the navigation device 18 has been completed (step S11: YES), then control proceeds to step S10.

Returning to step S5, if the driver 88 is visually distracted (step S5: YES), then in step S12 of FIG. 5, the ECU 22 judges whether or not the navigation device 18 is performing route guidance. If the navigation device 18 is not performing route guidance (step S12: NO), then control proceeds to step S15. If the navigation device 18 is performing route guidance (step S12: YES), then in step S13, the ECU 22 performs a visual distraction warning inhibition judging process. As will be described later with reference to FIG. 7, the visual distraction warning inhibition judging process is a process for judging whether or not a visual distraction warning should be inhibited, even if the visual distraction judging function 72 has judged that the driver 88 is visually distracted.

If a visual distraction warning is to be inhibited (step S14: YES) as a result of the visual distraction warning inhibition judging process performed in step S13, then control proceeds to step S6 in FIG. 4. If a visual distraction warning is not to be inhibited (step S14: NO), then, in step S15, the ECU 22 judges whether or not the visual distraction time T1 is equal to or greater than a threshold value THt1. The threshold value THt1 represents a time (e.g., a time ranging from 1 second to 4 seconds) required to finalize the judgment that the driver 88 is visually distracted. If the visual distraction time T1 is equal to or greater than the threshold value THt1, then the judgment that the driver 88 is visually distracted is finalized.

If the visual distraction time T1 is not equal to or greater than the threshold value THt1 (step S15: NO), then the present processing cycle is brought to an end, and control returns to step S1. If the visual distraction time T1 is equal to or greater than the threshold value THt1 (S15: YES), then in step S16, the ECU 22 (visual distraction warning function 74) issues a visual distraction warning. As described above, the visual distraction warning is issued both as a warning sound from the speaker 24 and as a warning indication displayed on the HUD 26. After step S16, control returns to step S1.

[3-2. Visual Distraction Judging Process]

Figure 6:
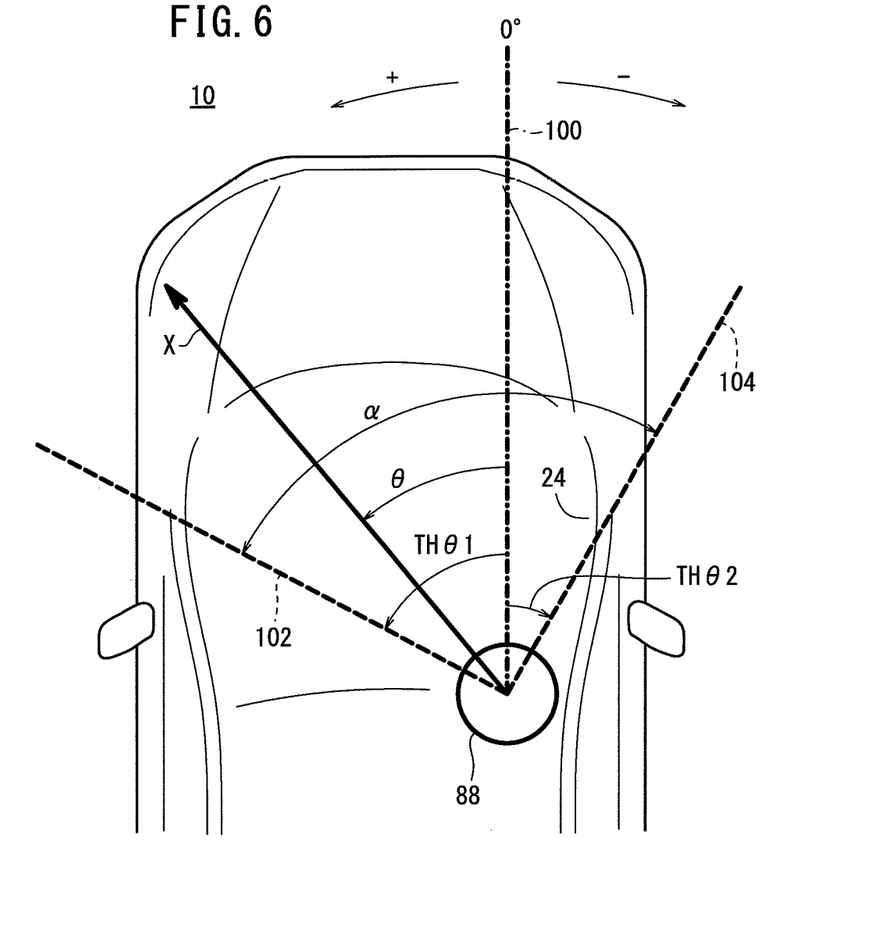
FIG. 6 is a plan view for describing the judgment of a visual distraction.

FIG. 6 is a plan view illustrating judgment of a visual distraction. In FIG. 6, reference numeral "100" denotes a line (hereinafter referred to as a "central line 100") indicating the front direction of the driver 88 or the front direction of the vehicle 10 in the position of the driver 88, and "θ" indicates an angle (hereinafter referred to as a "gazing angle θ") of the gazing direction X of the driver 88 from the central line 100. For ease of illustration, it is assumed that the gazing angle θ on the left side (counterclockwise) of the central line 100 (zero) is of a positive value, whereas the gazing angle θ on the right side (clockwise) of the central line 100 is of a negative value. The character "α" denotes a range (hereinafter referred to as a "non-visual-distraction angular area α" or a "non-visual-distraction area α"), which is judged by the ECU 22 (visual distraction judging function 72) as being a range in which the driver 88 is not visually distracted.

Reference numeral "102" denotes a line indicating the left end of the non-visual-distraction area α, whereas reference numeral "104" denotes a line indicating the right end of the non-visual-distraction area α. These lines will hereinafter be referred to as "non-visual-distraction area boundary lines 102, 104" or simply "boundary lines 102, 104". The boundary line 102 represents a predetermined value (hereinafter referred to as a "threshold value THθ1") with respect to the central line 100. If the gazing angle θ exceeds the threshold value THθ1 (θ>THθ1), then the ECU 22 (visual distraction judging function 72) judges that a visual distraction is taking place in the leftward direction (counterclockwise). Similarly, the boundary line 104 represents a predetermined value (hereinafter referred to as a "threshold value TH$\theta$2") with respect to the central line 100. If the gazing angle $\theta$ runs past the threshold value TH$\theta$2 ($\theta$<TH$\theta$2), then the ECU 22 (visual distraction judging function 72) judges that a visual distraction is taking place in the rightward direction (counterclockwise). If the gazing angle $\theta$ does not exceed either of the boundary lines 102, 104 (TH$\theta$2≤$\theta$≤TH$\theta$1), then the ECU 22 (visual distraction judging function 72) judges that a visual distraction is not taking place.

[3-3. Visual Distraction Warning Inhibition Judging Process]

Figure 7:
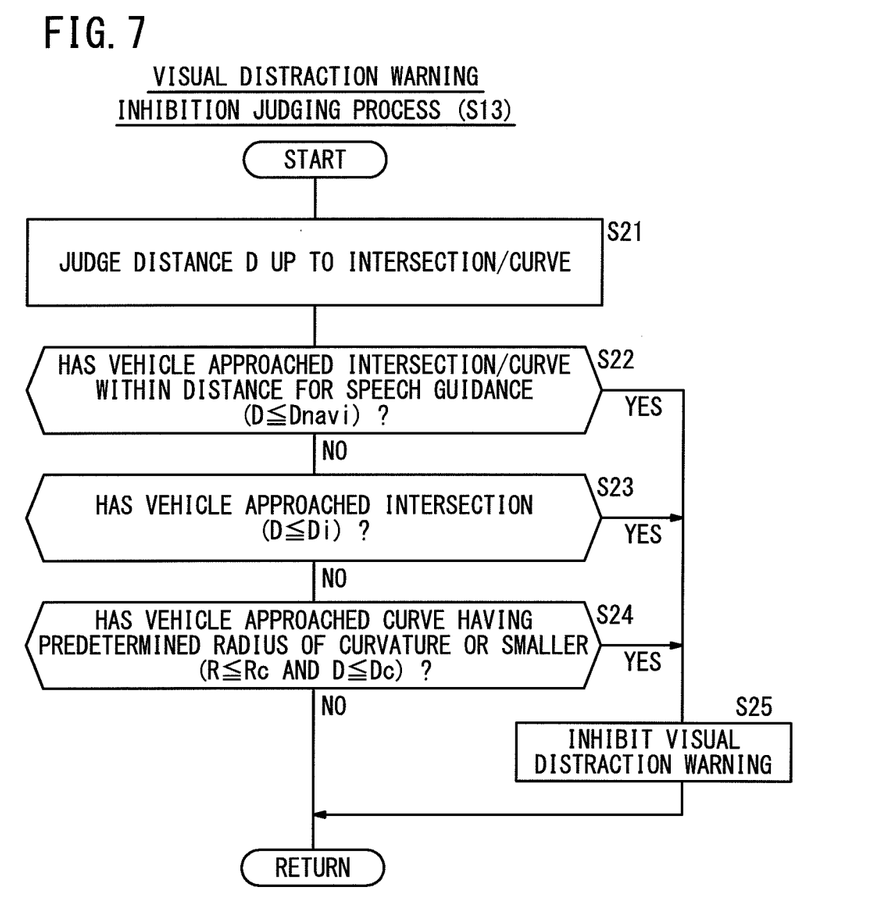
FIG. 7 is a flowchart of a visual distraction warning inhibition judging process.

FIG. 7 is a flowchart of the visual distraction warning inhibition judging process. In step S21, based on the navigational information referred to above, the ECU 22 judges the distance D from the vehicle 10 to the intersection 86 (FIG. 3) or a curve, for example. The intersection 86 refers to an intersection where the vehicle 10 is expected to turn to the left or the right on the guidance route. Alternatively, the intersection 86 may be an intersection at which the vehicle 10 is expected to travel straight through the intersection.

In step S22, the ECU 22 judges whether the vehicle 10 has approached the intersection 86 or a curve within a certain distance (hereinafter referred to as a "guidance execution distance Dnavi" or simply a "distance Dnavi") at which the navigation device 18 executes speech guidance concerning the intersection 86 or a curve. Specifically, the ECU 22 judges whether or not the distance D is equal to or less than the distance Dnavi. Alternatively, instead of or in addition to the speech guidance from the speaker 24, the ECU 22 may display on the HUD 26 a guidance indicator such as an arrow or the like pointing toward the direction in which the vehicle 10 is to turn.

If the vehicle 10 has not approached the intersection 86 or a curve within the distance Dnavi (step S22: NO), then in step S23, the ECU 22 judges whether or not the vehicle 10 has approached the intersection 86. More specifically, a threshold value (hereinafter referred to as an "intersection approaching judgment threshold value Di" or simply a "threshold value Di") for judging whether or not the vehicle 10 has approached the intersection 86 is preset, and the ECU 22 judges whether or not the distance D is equal to or less than the threshold value Di. The threshold value Di is set as a distance at which the driver 88 is likely to confirm the situation to the left or the right of the vehicle 10 in order to execute a left or a right turn, or is set as a distance greater than the above-mentioned distance, for example. Typically, the threshold value Di is set shorter than the distance Dnavi. If necessary, however, the threshold value Di may be set longer than or equal to the distance Dnavi.

If the vehicle 10 has not approached the intersection 86 (step S23: NO), then, in step S24, the ECU 22 judges whether or not the vehicle 10 has approached a curve having a predetermined radius of curvature or less. More specifically, a threshold value (hereinafter referred to as a "radius-of-curvature threshold value Rc" or simply a "threshold value Rc") indicative of the predetermined radius of curvature, and a threshold value (hereinafter referred to as a "curve approaching judgment threshold value Dc" or simply a "threshold value Dc") for judging whether or not the vehicle 10 has approached the curve are preset, and the ECU 22 judges whether or not the radius R of curvature of the present curve in question is equal to or less than the threshold value Rc, and whether or not the distance D is equal to or less than the threshold value Dc. The threshold value Dc is set as a distance at which the driver 88 should confirm the direction in which the curve proceeds in order to turn safely along the curve, i.e., a direction that may potentially exceed the threshold value TH$\theta$1 or the threshold value TH$\theta$2 from the front direction, or as a distance greater than the above-mentioned distance. Usually, the threshold value Dc is set shorter than the distance Dnavi. If necessary, however, the threshold value Dc may be set to be longer than or equal to the distance Dnavi.

If the vehicle 10 has not approached a curve having a predetermined radius of curvature (step S24: NO), i.e., if the radius R of curvature is not equal to or less than the threshold value Rc, or if the distance D is not equal to or less than the threshold value Dc, then the present processing sequence is brought to an end.

If the vehicle 10 has approached the intersection 86 or a curve within the distance Dnavi (step S22: YES), if the vehicle 10 has approached the intersection 86 (step S23: YES), or if the vehicle 10 has approached a curve having a predetermined radius of curvature (step S24: YES), then control proceeds to step S25.

In step S25, the ECU 22 (warning inhibiting function 76) inhibits a visual distraction warning from being issued. Consequently, a visual distraction warning is not issued, even if the visual distraction judging function 72 judges that the driver 88 is visually distracted.

4. Advantages of the Present Embodiment

According to the present embodiment, as described above, when the vehicle 10 approaches the intersection 86 or a curve within the predetermined distance (step S22: YES, step S23: YES, or step S24: YES), a visual distraction warning is inhibited. Therefore, an action, which the driver 88 takes to confirm the left or right of the vehicle 10 at the intersection 86 or the direction in which the curve proceeds, is not judged erroneously as being a visual distraction. Therefore, a visual distraction warning process can be performed accurately.

According to the present embodiment, the intersection 86 refers to an intersection at which the navigation device 18 guides the driver 88 to make a turn. The visual distraction warning process is inhibited in situations in which it is highly likely for the driver 88 to confirm the left or right of the vehicle 10. Consequently, the visual distraction warning process can be performed accurately.

According to the present embodiment, after the answer to any one of steps S22 through S24 is "YES" and until the answer to any one of steps S22 through S24 is "NO", the ECU 22 (warning inhibiting function 76) inhibits the process, i.e., the visual distraction warning process, which otherwise would be performed if the driver 88 were judged as being visually distracted, or the ECU 22 (warning inhibiting function 76) continues to carry out step S25. Since a visual distraction warning is inhibited from being issued only until the vehicle 10 actually finishes execution of the turn along the curve, the visual distraction warning process can be performed more accurately.

After the vehicle 10 has deviated from the guidance route (step S8 in FIG. 4) and until a new guidance route is set (step S11: YES), the visual distraction warning is inhibited from being issued, i.e., step S16 is not carried out. Therefore, even if the vehicle 10 deviates from the guidance route, a visual distraction warning is prevented from being issued erroneously while the guidance route is being reset.

According to the present embodiment, the intersection approaching judgment threshold value Di and the curve approaching judgment threshold value Dc are less than the guidance execution distance Dnavi. Therefore, even at times that the driver 88 confirms the left or right of the vehicle 10 or the direction in which the curve proceeds, as prompted by speech guidance or guidance displayed on the HUD 26 concerning the intersection 86 or the curve, an action to confirm the left or right of the vehicle 10 or the direction in which the curve proceeds is prevented from being judged erroneously as being a visual distraction. Therefore, the visual distraction warning process can be performed accurately.

According to the present embodiment, when the vehicle 10 approaches the intersection 86 within a predetermined distance (step S22: YES or step S23: YES), a visual distraction is not judged as occurring, i.e., step S25 is continuously carried out. Therefore, an action, which the driver 88 takes to confirm the left or right of the vehicle 10 at the intersection 86 or to gaze at a pedestrian or the like, is not judged erroneously as being a visual distraction, and hence, issuance of an inappropriate warning is avoided. If a certain numerical value, e.g., a TTC threshold value for judging whether or not a warning should be issued, is to be changed when a visual distraction is detected, then such a numerical value can be set appropriately.

5. Modifications

The present invention is not limited to the above embodiment, but various arrangements may be adopted based on the disclosure of the present description. For example, the present invention may adopt the following arrangements.

[5-1. Objects Capable of Incorporating the Visual Distraction Detecting Apparatus]

In the above embodiment, the warning apparatus 12 is incorporated in a vehicle 10. However, the warning apparatus 12 may be incorporated in other types of objects. For example, the warning apparatus 12 may be incorporated in mobile objects such as ships, aircrafts, etc. The warning apparatus 12 is not limited to being incorporated in mobile bodies, but may be incorporated in other apparatus that have a need to detect when occupants thereof are visually distracted.

[5-2. Visual Distraction Judging Process]

According to the present invention, a visual distraction is judged to have occurred by the process described with reference to FIG. 6. However, a visual distraction may be judged to have occurred by other processes, insofar as such processes are capable of judging whether or not an operator such as a driver 88 or the like is visually distracted.

[5-3. Warning Inhibiting Process]

The warning apparatus 12 according to the above embodiment inhibits a visual distraction warning, i.e., a warning for indicating the occurrence of a visual distraction to the driver 88, from being issued when the vehicle 10 approaches the intersection 86 or a curve within a predetermined distance (any one of steps S22 through S24: YES). However, another process, which normally would be performed when a visual distraction is detected, may be inhibited from being carried out when the vehicle 10 approaches the intersection 86 or a curve within a predetermined distance (any one of steps S22 through S24: YES). For example, as disclosed in JP2007-072629A, in which a warning is issued if a TTC (Time to Contact) is equal to or less than a predetermined value, a TTC threshold value may be changed upon the occurrence of a visual distraction, i.e., a TTC threshold value may not be increased even if a visual distraction is judged to have occurred. Furthermore, rather than inhibiting a warning from being issued, a camera output may be invalidated, as disclosed in JP2007-072629A. Alternatively, in an arrangement in which the acceleration or the vehicle speed of the vehicle 10 is limited when a visual distraction is detected, the acceleration or the vehicle speed may be inhibited from being limited. Further, in an arrangement in which the vehicle 10 is automatically decelerated when a visual distraction is detected, the vehicle 10 may be inhibited from being automatically decelerated.

In the above embodiment, the visual distraction warning inhibition judging process is carried out according to the flowchart shown in FIG. 7. However, the visual distraction warning inhibition judging process is not limited to the features of the flowchart shown in FIG. 7. The visual distraction warning inhibition judging process may be carried out according to another flowchart, insofar as a visual distraction warning, i.e., a warning for indicating the occurrence of a visual distraction to the driver 88, can be inhibited from being issued based on the fact that the vehicle 10 approaches the intersection 86 or a curve within a predetermined distance.

Figure 8:
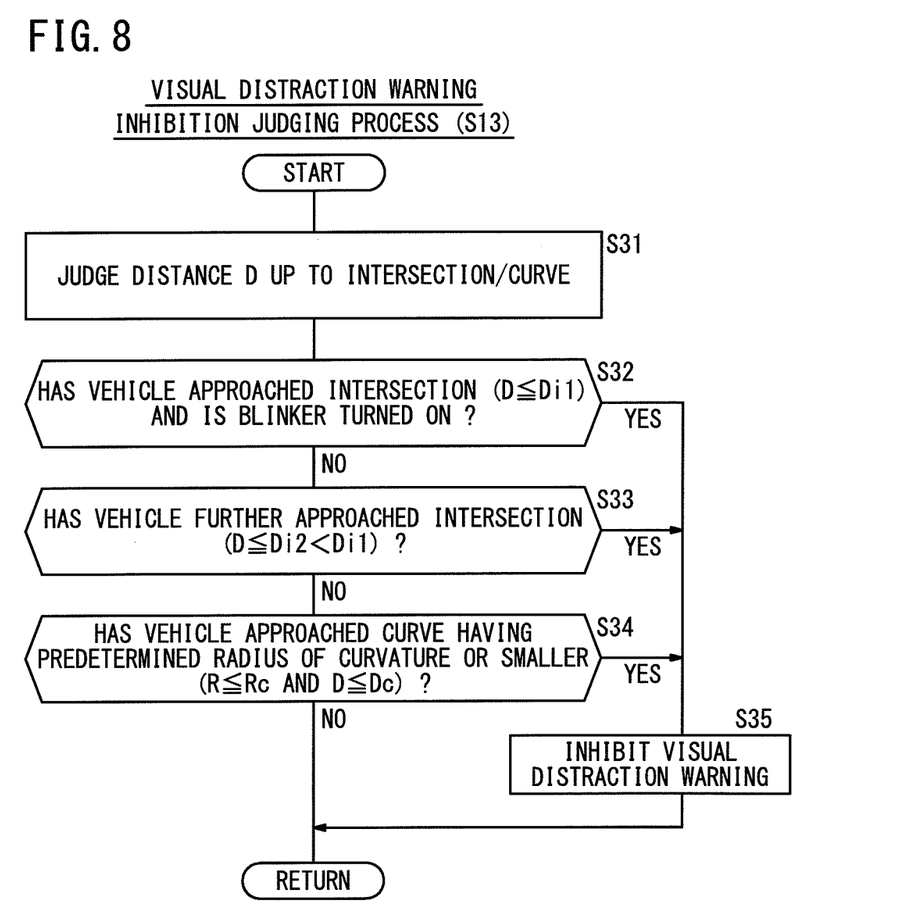
FIG. 8 is a flowchart of a modification of the visual distraction warning inhibition judging process shown in FIG. 7.

FIG. 8 is a flowchart of a modification of the visual distraction warning inhibition judging process. In step S31, the ECU 22 judges the distance D from the vehicle 10 to the intersection 86 or a curve. This judging process is the same as that performed in step S21 of FIG. 7.

In step S32, the ECU 22 judges whether or not the vehicle 10 approaches the intersection 86 and whether or not a blinker (not shown) is turned on. More specifically, a threshold value (hereinafter referred to as an "intersection approaching judgment threshold value Di1" or simply a "threshold value Di1") for judging whether or not the vehicle 10 has approached the intersection 86 is preset, and the ECU 22 judges whether or not the distance D is equal to or less than the threshold value Di1. The threshold value Di1 may be set as a distance at which the blinker is expected to be turned on or a value in the vicinity thereof, for example. After the blinker has been turned on by a switch that is operated by the driver 88, the blinker continues operating after the steering angle θs detected by the steering angle sensor 20 has exceeded a first steering angle threshold value and until the steering angle θs becomes less than a second steering angle threshold value. The second steering angle threshold value may be set equal to or less than the first steering angle threshold value.

If the vehicle 10 has not approached the intersection 86 and the blinker has not been operated (step S32: NO), then in step S33, the ECU 22 judges whether or not the vehicle 10 has further approached, i.e., has approached more closely to, the intersection 86. More specifically, a threshold value (hereinafter referred to as an "intersection approaching judgment threshold value Di2" or simply a "threshold value Di2") for judging whether or not the vehicle 10 has further approached the intersection 86 is preset, and the ECU 22 judges whether or not the distance D is equal to or less than the threshold value Di2. The threshold value Di2 is set less than the threshold value Di1 (Di2<Di1).

If the vehicle 10 has not approached closer to the intersection 86 (step S33: NO), then in step S34, the ECU 22 judges whether or not the vehicle 10 has approached a curve having a predetermined radius of curvature or less. The judging process of step S34 is the same as the judging process of step S24 of FIG. 7.

If the vehicle 10 has approached the intersection 86 and the blinker has been operated (step S32: YES), or if the vehicle 10 has further approached the intersection 86 (step S33: YES), or if the vehicle 10 has approached a curve having a predetermined radius of curvature or less (step S34: YES), then control proceeds to step S35.

In step S35, the ECU 22 (warning inhibiting function 76) inhibits a visual distraction warning from being issued. Therefore, a visual distraction warning process is not carried out, even if the ECU 22 (visual distraction judging function 72) has judged that the driver 88 is visually distracted.

According to the present modification, since a visual distraction warning is inhibited from being issued until the blinker is turned on, i.e., until the vehicle 10 finishes turning through the intersection 86, the visual distraction warning process can be performed more accurately.

In the above embodiment, using navigational information from the navigation device 18, the ECU 22 detects that the vehicle 10 has approached the intersection 86 or a curve within a predetermined distance. However, the ECU 22 is not limited to using navigational information from the navigation device 18. Other information may be used, insofar as such information enables the ECU 22 to detect that the vehicle 10 has approached the intersection 86 or a curve within a predetermined distance. For example, the ECU 22 may detect that the vehicle 10 has approached the intersection 86 or a curve based on communications between the warning apparatus 12 and communication units, e.g., optical beacons, laid on the roadside. Alternatively, using an image from an image capturing device, e.g., an infrared camera, which captures images around the periphery of the vehicle 10, the ECU 22 may judge the distance D up to an intersection or a curve, a traffic signal, or a mark that indicates an intersection or a curve.

The invention claimed is:

1. A visual distraction detecting apparatus comprising:
   a present position identifying unit for identifying a present position of a vehicle;
   a gazing direction detecting unit for detecting a gazing direction of an occupant of the vehicle based on a viewing direction or a facial direction of the occupant;
   a visual distraction judging unit for judging that the occupant is visually distracted if the gazing direction of the occupant is angularly spaced from a front direction of the occupant by a predetermined angle or greater;
   an inhibiting unit for inhibiting a visual distraction warning process, which would be performed to issue a warning to the occupant if the occupant were judged as being visually distracted, when the present position identified by the present position identifying unit is located within a first predetermined distance from an intersection; and
   a route guiding unit for guiding the vehicle along a route set by the occupant,
   wherein the intersection is an intersection at which the route guiding unit guides the occupant to make a turn.

2. The visual distraction detecting apparatus according to claim 1,
   wherein the inhibiting unit inhibits the visual distraction warning process, which would be performed to issue a warning to the occupant if the occupant were judged as being visually distracted, until the present position identifying unit judges that the vehicle has completed a change in path.

3. The visual distraction detecting apparatus according to claim 2, further comprising:
   an informing unit for informing the occupant of the intersection when the vehicle reaches a position within a second predetermined distance from the intersection at which the route guiding unit guides the occupant to make a turn,
   wherein the first predetermined distance is shorter than the second predetermined distance.

4. The visual distraction detecting apparatus according to claim 3, wherein
   the inhibiting unit inhibits the visual distraction warning process, which would be performed to issue a warning to the occupant if the occupant were judged as being visually distracted, when the present position identified by the present position identifying unit is located within the first predetermined distance from the intersection and the route guiding unit is guiding the vehicle along the route; and
   the visual distraction warning process is allowed to be performed at any distance from the intersection on a condition that the occupant is judged as being visually distracted, unless the route guiding unit is guiding the vehicle along the route.

5. The visual distraction detecting apparatus according to claim 2, wherein
   the inhibiting unit inhibits the visual distraction warning process, which would be performed to issue a warning to the occupant if the occupant were judged as being visually distracted, when the present position identified by the present position identifying unit is located within the first predetermined distance from the intersection and the route guiding unit is guiding the vehicle along the route; and
   the visual distraction warning process is allowed to be performed at any distance from the intersection on a condition that the occupant is judged as being visually distracted, unless the route guiding unit is guiding the vehicle along the route.

6. The visual distraction detecting apparatus according to claim 1, wherein
   the inhibiting unit inhibits the visual distraction warning process, which would be performed to issue a warning to the occupant if the occupant were judged as being visually distracted, when the present position identified by the present position identifying unit is located within the first predetermined distance from the intersection and the route guiding unit is guiding the vehicle along the route; and
   the visual distraction warning process is allowed to be performed at any distance from the intersection on a condition that the occupant is judged as being visually distracted, unless the route guiding unit is guiding the vehicle along the route.

7. A visual distraction detecting apparatus comprising:
   a present position identifying unit for identifying a present position of a vehicle;
   a gazing direction detecting unit for detecting a gazing direction of an occupant of the vehicle based on a viewing direction or a facial direction of the occupant;
   a visual distraction judging unit for judging that the occupant is visually distracted if the gazing direction of the occupant is angularly spaced from a front direction of the occupant by a predetermined angle or greater;
   an inhibiting unit for inhibiting a process, which would be performed if the occupant were judged as being visually distracted, when the present position identified by the present position identifying unit is located within a first predetermined distance from an intersection;
   a route guiding unit for guiding the vehicle along a route set by the occupant; and
   a steering angle detecting unit for detecting a steering angle of a steering wheel of the vehicle,
   wherein the intersection is an intersection at which the route guiding unit guides the occupant to make a turn, and
   the inhibiting unit inhibits the process, which would be performed if the occupant were judged as being visually distracted, until the steering angle detecting unit detects that the steering angle has changed from a value that is greater than a predetermined steering angle threshold value to a value that is less than the predetermined steering angle threshold value.

8. The visual distraction detecting apparatus according to claim 7, further comprising:
   an informing unit for informing the occupant of the intersection when the vehicle reaches a position within a second predetermined distance from the intersection at which the route guiding unit guides the occupant to make a turn, wherein the first predetermined distance is shorter than the second predetermined distance.

9. A visual distraction detecting apparatus comprising:

a present position identifying unit for identifying a present position of a vehicle;

a gazing direction detecting unit for detecting a gazing direction of an occupant of the vehicle based on a viewing direction or a facial direction of the occupant;

a visual distraction judging unit for judging that the occupant is visually distracted if the gazing direction of the occupant is angularly spaced from a front direction of the occupant by a predetermined angle or greater;

an inhibiting unit for inhibiting a process, which would be performed if the occupant were judged as being visually distracted, when the present position identified by the present position identifying unit is located within a first predetermined distance from an intersection;

a route guiding unit for guiding the vehicle along a route set by the occupant; and a resetting unit for automatically resetting a route when the vehicle has traveled along a route that differs from the route along which the route guiding unit has guided the vehicle wherein the intersection is an intersection at which the route guiding unit guides the occupant to make a turn, and the inhibiting unit inhibits the process, which would be performed if the occupant were judged as being visually distracted, until the resetting unit automatically resets a route.

10. The visual distraction detecting apparatus according to claim 9, further comprising:

an informing unit for informing the occupant of the intersection when the vehicle reaches a position within a second predetermined distance from the intersection at which the route guiding unit guides the occupant to make a turn, wherein the first predetermined distance is shorter than the second predetermined distance.

* * * * *